United States Patent [19]
Morikawa et al.

[11] 3,758,621
[45] Sept. 11, 1973

[54] PROCESS FOR PRODUCING CYCLODODECATRIENES

[75] Inventors: Hiroyuki Morikawa; Akiya Nakamura; Noriyoshi Tamura; Kazuo Yamagishi, all of Ami-machi, Japan

[73] Assignee: Mitsubishi Petrochemical Company, Limited, Tokyo-to, Japan

[22] Filed: Dec. 14, 1971

[21] Appl. No.: 207,955

[30] Foreign Application Priority Data
Dec. 25, 1970 Japan.............................. 45/117720

[52] U.S. Cl.......................... 260/666 B, 252/431 P
[51] Int. Cl................................................. C07c 3/00
[58] Field of Search .............................. 260/666 B; 252/431 P

[56] References Cited
UNITED STATES PATENTS

| | | |
|---|---|---|
| 3,641,187 | 2/1972 | Furukawa et al. .............. 260/666 B |
| 3,644,548 | 2/1972 | Takahasi et al. ................ 260/666 B |
| 3,663,639 | 5/1972 | Morikawa et al. .............. 260/666 B |
| 3,076,045 | 1/1963 | Schneider et al. .............. 260/666 B |
| 3,149,173 | 9/1964 | Wittenberg et al. ............ 260/666 B |
| 3,636,174 | 1/1972 | Nakamura et al............... 260/666 B |

*Primary Examiner*—Delbert E. Gantz
*Assistant Examiner*—Veronica O'Keefe
*Attorney*—E. F. Wenderoth, Michael R. Davis et al.

[57] ABSTRACT

Crude butadiene-1,3 which is a B-B fraction is subjected to catalytic trimerization to produce cyclododecatriene-1,5,9 in the presence of a Ziegler-type catalyst comprising a Ti-compound, e.g., Ti(OPrCl)Cl$_3$, an Al-compound, e.g., AlEt$_2$Cl, and electron-donor compounds containing S and containing P, e.g., dimethyl sulfoxide and triphenyl phosphate.

7 Claims, No Drawings

PROCESS FOR PRODUCING CYCLODODECATRIENES

BACKGROUND OF THE INVENTION

This invention relates to a process for producing cyclododecatrienes of high purity from butadiene of low purity.

It is well known that the cyclic trimer of butadiene can be produced by subjecting it to catalytic trimerization, and that Ziegler catalysts (consisting of, in combination, a transition metal component and an organometallic compound, and sometimes including denaturants or modifiers such as electron-donor compounds) constitute a group of the catalysts that can be used for the trimerization. Titanium compounds and organoaluminum compounds are a representative transition metal component and an organometalic compound, respectively, and electron donative compounds containing nitrogen, oxygen, phosphorus, or sulphur are well suited for the denaturant.

When high purity butadiene is used as a starting material, there are various known processes for cyclic trimerization over through the use of such a Ziegler type catalyst. If high purity cyclododecatriene could be produced by using low purity butadiene, particularly $C_4$-fraction (so-called B-B fraction) obtained by naphtha decomposition, it would be advantageous. However, the result is affected by the kinds and quantities of impurities contained in low purity butadiene, thus lacking in reproducibility, so that a process wherein low purity butadiene is selectively used for the purpose of a starting material for producing cyclododecatrienes of high purity has not yet been found, although there are some references mentioning the possibitily of the use of such a low purity butadiene without taking the reproducibitily into consideration.

As to the impurity poisoning the catalyst that is used for the trimerization of butadiene, acetylene and allene are known ("Annalen" No. 681, p. 10, (1965)). Consequently, even when high purity butadiene is used as a starting material, a prehydrogenation process is usually required for removing these impurities.

Therefore, a B—B fraction containing large amounts of acetylenic hydrocarbons and allene and other impurities can not be used as a starting material for the production of high purity cyclododecatrienes until it has been purified to a considerably high degree of purity beforehand.

SUMMARY OF THE INVENTION

An object of this invention is to provide an industrial possibility of producing cyclododecatrienes through the use of a B—B fraction as a starting material. We have found that this object can be achieved by controlling the impurities of the B—B fraction and using a special Ziegler-type catalyst.

Consequently, the process for producing cyclododecatriene-(1,5,9) according to this invention is characterized in that a B—B fraction (containing 25 - 90 percent by weight of butadiene), of which the cyclopentadiene content is controlled to less than 0.1 weight per cent, is brought into contact with a Ziegler-type catalyst comprising a titanium compound, an aluminum compound, an electron-donor compound containing phosphorus and an electron-donor compound containing sulphur, its butadiene thus undergoing cyclic trimerization.

DETAILED DESCRIPTION

As has been mentioned above, the use of a specific Ziegler-type catalyst, which is an important requisite for this invention, resulted from the development of our preceding invention (Japanese Pat. No. 45-52395 (1970). In this preceding invention, we found that catalysts of $Ti(ORCl)_nCl_{4-n}\cdot AlR'_m Cl_{3-m}\cdot SOR''_2$ and/or $POR'''_3$ series make it possible to produce high purity cyclododecatrienes from low purity butadiene admixed with acetylenic hydrocarbons and allene.

Further investigations on the denaturated catalyst brought us to the discovery that when the cyclopentadiene included in a B—B fraction was removed, not only was the yield of the obtained cyclododecatriene improved remarkably, but the purity of the cyclododecatrienes produced was far higher. Moreover, it was a great surprise to discover that even when acetylene and allene existed in the fraction up to an amount of about 30,000 ppm, high purity cyclododecatrienes could be obtained by using this denaturated catalyst, but when cyclopentadiene was present in an amount of more than 1,000 ppm, it become difficult to obtain cyclododecatrienes of high purity.

Therefore, on the basis of this invention developed from the preceding invention, the yield and purity of the cyclododecatrienes which are obtained from a B—B fraction without removing acetylenic hydrocarbons and allene by prehydrogenation are remarkably high when the B—B fraction is freed from cyclopentadiene or it contains a smaller amount of cyclopentadiene, because the catalyst is resistant to acetylenic hydrocarbons and allene.

The present invention has an important significance in establishing standards for judging the quality of a B—B fraction which will be used as a butadiene-containing starting material for the production of cyclododecatrienes, and, further, on the point of practical performance wherein the process of removing cyclopentadiene is usually simpler than that of prehydrogenation, and the only measure for the decrease of the cyclopentadiene content being to slightly modify the procedures for recovering the B—B fraction in the naphtha decomposition process.

The catalyst used in the present invention comprises, in combination, a titanium compound, an organoaluminum compound, and organic compounds containing phosphorus and sulphur:

Titanium compound

Titanium compounds representable by the general formula $TiX_nY_{4-n}$ (wherein X is a halogen, Y is an alkoxy group, a cycloalkoxy group, a chloroalkoxy group (each of alkoxy moieties there-of having from one to about 10 carbon atoms), a acetylacetonato group, an aryloxy group, a chloroaryloxy group (each of the aryloxy groups is a phenoxy group or a methyl-substituted phenoxy group), and $n$ is a positive integer of from 0 to 4, inclusive), or $TiOZ_2$ (wherein Z is a halogen, an alkoxy group, a cycloalkoxy group (each having from one to about 10 carbon atoms), an aryloxy group (a phenoxy group or a methylphenoxy group), an acetylacetonato group) are suitable.

EXAMPLES:

Titanium tetrachloride
Titanium tetrabromide
Titanium butoxytrichloride

Titanium diethoxydichloride
Titanium triethoxychloride
Titanium tetrabutoxide
Titanium phenoxytrichloride
Titanium cresoxytrichloride
Titanium chloroporpoxyteichloride
Titanium di (chloroethoxy) dichloride
Titanium trichloroacetylacetonate
Titanium dichlorodiacetylacetonate
Titanyl chloride
Titanyl bromide
Titanyl dibutoxide Aluminum compound Aluminum compounds representable by the general formula $AlR'_mCl_{3-m}$ (wherein $R'$ is an alkyl group, a chloroalkyl group (each having from one to about 10 carbons), an aryl group (a phenyl group or a methyl-substituted phenyl group), and $m$ is 1.5 or 2) are suitable.

EXAMPLES:

Dimethylaluminum chloride
Diethylaluminum chloride
Diisobutylaluminum chloride
Diphenylaluminum chloride
Dioctylaluminum chloride
Methylaluminum sesquichloride
Ethylaluminum sesquichloride
Butylaluminum sesquichloride Electron-donor compounds A. Phosphorus compounds representable by the general formula $PRO''_3$ wherein $R''$ is an alkyl group, a cycloalkyl group (each having from one to about 10 carbons), an aryl group (a phenyl group or a methyl-substituted phenyl group), an alkoxy group (of from one to about 10 carbons) and an aryloxy group in which the aryl moiety is phenyl or a methyl-substituted phenyl group are suitable.

EXAMPLE:

Trimethylphosphine oxide
Triethylphosphine oxide
Tripropylphosphine oxide
Tributylphosphine oxide
Triphenylphosphine oxide
Tricresylphosphine oxide
Trimethyl phosphate
Triethyl phosphate
Tributyl phosphate
Triphenyl phosphate
Tricresyl phosphate B. Sulphur compounds representable by the general formula $SOR'''_2$ (wherein $R'''$ is an alkyl group (of from one to about 10 carbons), an aryl group (a phenyl group, or a methyl-substituted group) are suitable.

EXAMPLE:

Dimethyl sulfoxide
Dipropyl sulfoxide
Dibutyl sulfoxide
Diphenyl sulfoxide

Catalyst composition

The ratio of the titanium compound content to the aluminum compound content of the catalyst system to be used can be varied over a wide range. In general, Al/Ti as a molar ratio is from one to 100, preferably from 3 to 10.

The electron-donor compound content of the catalyst system, as calculated with respect to a phosphorus compound (P) and a sulphur compound (S), is P+S/Ti = 0.10 to 4.0 as a molar ratio, preferably 0.1 to 1.0, and P/S = 0.01 to 10.0, preferably 0.1 to 3.0.

Method of preparing the catalyst

The catalyst can be readily prepared by mixing the compounds in a stream of an inert gas or in a vapour stream of the starting material B—B fraction. It is desirable that the titanium compound, electron-donor compound, and aluminum compound be added in this order.

Trimerization reaction:

Solvent

The trimerization can be carried out either in the presence of or in the absence of a solvent, but usually its operation is preferably peformed in the presence of a solvent.

As for the solvent to be used, a solvent which can be used in such a catalytic trimerization reaction, for example, an aromatic hydrocarbon such as benzene, toluene, xylene, etc., or an aliphatic hydrocarbon such as hexane, heptane, is suitable.

Reaction temperature and pressure

The reaction temperature can be varied in a range of from 0° to 100°C, preferably in a range of from 30° to 80°C. The reaction can be carried out either at atmospheric pressure or under a higher pressure.

Starting material:

B—B fraction

The term "B—B fraction" as used herein designates a $C_4$-fraction obtained in the naphtha decomposition. (The naphtha decomposition is a process for producing unsaturated olefins or dienes usually from naphtha by subjecting it to thermal decomposition. For details of the process, "Petroleum and Petroleum Chemistry" Vol.12, No.1, p. 47 should be referred to.

The fraction is a mixture having usually the following composition (weight %).

1,3-Butadiene = 25 – 50 percent
Butene + Butane = 50 – 70 percent
Allene = 0.02 – 2 percent
Methylacetylene = 0.02 – 2 percent
Ethylacetylene = 0.05 – 2 percent
Vinylacetylene = 0.05 – 2 percent
Cyclopentadiene = 0.1 – 2 percent The B—B fraction to be obtained from the naphtha decomposition process is usually isolated by distillation, so that it can be considered that a purification process has taken place to some degree. Nevertheless, when it is used as a starting material of this invention, further distillation may be carried out as needed. Consequently, the B—B fraction defined in this invention is one containing from 25 to 90 percent of butadiene.

Butadiene content and other features

The butadiene content is from 25 to 90 percent by weight, and the effectiveness of this invention is fully exhibited provided that the butadiene content is in this range.

Further, as a result of our investigations, we found that when the butadiene content is increased to from 60 to 90 percent by weight, the purity of the resulting cyclododecatriene is always from 99.8 to 99.98 percent, which has the advantage of remarkably simplifying the purification process.

Therefore, it is certainly preferable that the butadiene content be concentrated up to from 60 to 90 percent by weight along with controlling the cyclopentadiene content to less than 0.1 weight percent.

It is desirable that the acetylene and allene contents be less than 3 percent by weight.

EXAMPLES:

Example for comparison

In Table 1, the results of a study in connection with various titanium-containing catalysts are shown. It is apparent that the cyclopentadiene content of a crude B—B fraction has a great effect on the yield and purity of the cyclododecatriene produced. Consequently, cyclododecatrienes of an industrially sufficient high purity can be obtained by controlling the cyclopentadiene content of the crude B—B fraction to less than 0.1 weight percent in a pretreatment process.

The use of a crude B—B fraction containing more than 0.10 percent cyclopentadiene, without carrying out the process of this invention, results in a considerable decreases of the yield of the produced cyclododecatriene and, in addition, a lowering of the purity thereof.

TABLE 1 effect of the cyclopentadiene content of a starting material B-B fraction

| Titanium compound in catalyst | Cyclopentadiene content in B-B fraction (weight %) | Yield of cyclododecatriene (weight %) | Purity of cyclododecatriene fraction (weight %) |
|---|---|---|---|
| Ti(OPrCl)Cl$_3$ | 0.15 | 26 | 83.09 |
| Do. | 0.10 | 63 | 98.90 |
| Do. | 0.05 | 64 | 99.51 |
| Do. | 0.00 | 76.6 | 99.89 |
| Ti(OBu)Cl$_3$ | 0.15 | 18 | 81.10 |
| Do. | 0.10 | 60.8 | 98.40 |
| Do. | 0.00 | 66.1 | 99.89 |
| Ti(OBu)$_4$ | 0.15 | 3 | 80.5 |
| Do. | 0.10 | 7.1 | 91.19 |
| Do. | 0.00 | 38 | 99.25 |

Note 1: The yield of cyclododecatriene is the weight percentage of the produced pure cyclododecatriene based on the amount of butadiene supplied.
Note 2: The purity of cyclododecatriene fraction is determined by analyzing the cyclododecatriene fraction at 235° – 250°C of the product using a gas chromatograph equipped with a capillary column (Apiezon-L, 40m, 148°C)
Note 3: The gas composition of the starting material B—B fraction (weight %)
1,3-Butadiene 37.0; Allene 0.20; Methylacetylene 0.10; Ethylacetylene 0.10; Vinylacetylene 0.40; Cyclopentadiene (Table 1).
The remainder is a mixture of butane, butene-1, butene-2 and isobutene.
Note 4: Reaction conditions
Benzene 100c.c.; titanium compound 1 m.mol.; diethyl-aluminum chloride 0.606 g.; Triphenyl phosphate 0.026g.; dimethyl sulfoxide 0.064g.; reaction temperature 75°C; reaction time 3 hours.

EXAMPLE 1

The atmosphere of an autoclave of a volume of 500 c.c. was replaced with argon gas, then 100c.c. of benzene, 0.258g. of chloropropoxytrichlorotitanium, 0.606g. of diethylaluminum chloride, 0.026g. of triphenyl phosphate, and 0.064g. of dimethyl sulfoxide were added and mixed at 40°C to prepare a catalyst. Next, the autoclave was charged with 62g of a B—B fraction of which the cyclopentadiene content had been diminished by pretreatment (37 percent 1,3-butadiene, 0.2 percent allene, 0.10 percent methylacetylene, 0.10 percent ethylacetylene, 0.40 percent vinylacetylene, 0.05 percent cyclopentadiene, and 62.15 percent of a mixture of butane + butene), and the mixture was stirred for 3 hours at 75°C.

Thereafter, methanol was added to decompose the catalyst, and the product was separated by distillation.

A cyclododecatriene fraction having boiling points of 235°–250°C (99.51 percent pure) was obtained in an amount of 14.7 g. The yield of pure cyclododecatriene based on the butadiene used was 64 per cent. When a crude B—B fraction (having the same composition as above except the cyclopentadiene content was 0.15 percent) was used as a starting material without treating it beforehand, the amount of the cyclododecatriene fraction obtained was 7.16g. (83.09 percent pure), and its yield was 26 per cent.

EXAMPLE 2

By using 62g. of a B—B fraction containing 0 percent cyclopentadiene (the other constituents were the same as in Example 1) as a raw material and the same treatment as in Example 1 was carried out.

A cyclododecatriene fraction was obtained in an amount of 17.6 g. (99.89 percent pure) in a yield of 76.6 per cent.

EXAMPLE 3

By using 100c.c. of benzene, 0.278 g. of di(chloroethoxy)- dichlorotitanium, 0.606g. of diethylaluminum chloride, 0.020g. of tributylphosphine oxide, 0.064g. of dimethyl sulfoxide, and 62g. of a B—B fraction (having the same composition as in Example 1 except the cyclopentadiene content was 0.10 percent), the same treatment as in Example 1 was carried out.

A cyclododecatriene fraction was obtained in an amount of 14.6 g. (98.9 percent pure), and its yield was 63 per cent.

EXAMPLE 4

By using 100c.c. of benzene, 0.228 g. of titanium butoxytrichloride, 0.606g. of diethylaluminum chloride, 0.021g. of triphenyl phosphate, 0.064g. of dimethyl sulfoxide and 62g. of a B—B fraction (having the same composition as in Example 2), the same treatment as in Example 1 was carried out.

A cyclododecatriene fraction was obtained in an amount of 15.2g. (99.89 percent pure) in a yield of 66.1 per cent.

When a crude B—B fraction (having the same composition as in Example 1 except the cyclopentadiene content was 0.15 percent) was used as a starting material without treating it beforehand, 5.1g. of cyclododecatriene fraction (81.10 percent pure) was obtained in a yield of 18 percent.

EXAMPLE 5

When 62g. of a B—B fraction (having the same composition as in Example 3) was used under the same conditions as in Example 4, a cyclododecatriene fraction (98.40 percent pure) was obtained in an amount of 14.2g. and in a yield of 60.8 per cent.

EXAMPLE 6

By using 100 c.c. of benzene, 0.340g. of tetrabutoxytitanium, 0.606 g. of diethylaluminum chloride, 0.021g. of triphenyl phosphate, 0.064g. of dimethyl sulfoxide and 62g. of a B—B fraction (having the same composition as in Example 2), the same treatment as in Example 1 was carried out. A cyclododecatriene fraction was obtained in an amount of 8.8 g. (99.25 percent pure) in a yield of 38 per cent.

When 62g. of a crude B—B fraction (having the same composition as in Example 6 except the cyclopentadiene content was 0.15 percent) was used as a starting material without treating it beforehand, a cyclododecatriene fraction was obtained in an amount of 0.89g. (80.5 percent pure) in a yield of 3 per cent.

EXAMPLE 7

By using 100c.c. of toluene, 0.190g. of tetrachlorotitanium, 0.50 g. of diethylaluminum chloride, 0.02 g. of triphenyl phosphate, 0.05 g. of dimethyl sulfoxide and 62g. of a B—B fraction (having the same composition as in Example 2), the same treatment as in Example 1 was carried out.

A cyclododecatriene fraction was obtained in an amount of 12.1 g. (98.9 percent pure) in a yield of 52 percent.

EXAMPLE 8

By using 100c.c. of toluene, 0.256g. of dibutoxydichlorotitanium, 0.98 g. of ethylaluminum sesquichloride, 0.02 g. of triphenyl phosphate, 0.05g. of dimethyl sulfoxide and 62g. of a B—B fraction (having the same composition as in Example 1), the same treatment as in Example 1 was carried out.

A cyclododecatriene fraction was obtained in an amount of 13.0g. (98.7 percent pure) in a yield of 56 per cent.

What is claimed is:

1. A process for producing cyclododecatriene-1,5,9 comprising contacting a B–B fraction (containing 25 — 90 weight percent of butadiene, of which fraction the cyclopentadiene content is controlled to less than 0.1 weight percent, with a Ziegler type catalyst comprising, in combination, (I) a titanium compound, (II) an aluminum compound, and (III) an electron-donor compound containing phosphorus (IIIA) and an electron-donor compound containing sulphur (IIIB), thereby causing the butadiene to undergo cyclic trimerization.

2. A process for producing cyclododecatriene-1,5,9 as claimed in claim 1 in which said B—B fraction is a distillation product of crude B—B fraction which has been derived from naphtha cracking and comprises:

| | % by weight |
|---|---|
| 1,3-butadiene | 25 to 50 |
| butane + butene | 50 to 70 |
| allene | 0.02 to 2 |
| methylacetylene | 0.02 to 2 |
| ethylacetylene | 0.05 to 2 |
| vinylacetylene | 0.05 to 2 |
| cyclopentadiene | 0.1 to 2 |

3. A process for producing cyclododecatriene-1,5,9 as claimed in claim 1 in which said B—B fraction contains 60 to 90 percent by weight of butadiene.

4. A process for producing cyclododecatriene-1,5,9 as claimed in claim 1 in which said titanium compound (I) has the general formula:

$$TiX_nY_{4-n}$$

wherein X is halogen, Y is alkoxy, cycloalkoxy, or chloroalkoxy, each alkoxy group having from one to 10 carbon atoms, acetylacetonato, aryloxy, or a chloroaryloxy, each aryloxy group being selected from the group consisting of phenoxy and methyl-substituted phenoxies, and n is a positive integer of from 0 to 4, inclusive, and said aluminum compound (II) has the general formula:

$$AlR'_mCl_{3-m}$$

wherein R' is alkyl or cycloalkyl of one to 10 carbon atoms, aryl selected from the group consisting of phenyl and methyl-substituted phenyls, and m is 1.5 or 2, the mole ratio of the compound (II)/the compound (I) being 1 to 100.

5. A process for producing cyclododecatriene-1,5,9 as claimed in claim 1 in which said electron-donor compound containing phosphorus (IIIA) has the general formula:

$$POR''_3$$

wherein R'' is alkyl or cycloalkyl having from one to 10 carbon atoms, aryl selected from the group consisting of phenyl and methyl substituted phenyls, alkoxy of one to 10 carbon atoms, or aryloxy selected from the group consisting of phenoxy and methyl-substituted phenoxies, and said electron donor compound containing sulphur (IIIB) has the general formula:

$$SOR'''_2$$

wherein R''' is alkyl having one to 10 carbon atoms, or aryl selected from the group consisting of phenyl and methyl-substituted phenyls, the mole ratio of the (compound IIIA − compound IIIB)/the titanium compound (I) being 0.01 to 4.0, and the mole ratio of the compound IIIA/the compound IIIB being 0.01 to 10.0.

6. A process for producing cyclododecatriene-1,5,9 as claimed in claim 1 in which said catalyst is produced by adding the aluminum compound (II) to a mixture of the titanium compound (I) and the electron-donor compound IIIA and IIIB.

7. A process for producing cyclododecatriene-1,5,9 as claimed in claim 1 in which said B—B fraction is caused to contact the Ziegler catalyst in an organic solvent.

* * * * *